(12) United States Patent

Ganong, III et al.

(10) Patent No.: US 12,572,631 B2

(45) Date of Patent: Mar. 10, 2026

(54) SYSTEM AND METHOD FOR WATERMARKING DATA FOR TRACING ACCESS

(71) Applicant: Microsoft Technology Licensing, LLC, Redmond, WA (US)

(72) Inventors: William Francis Ganong, III, Brookline, MA (US); Ljubomir Milanovic, Vienna (AT); Dushyant Sharma, Tracy, CA (US); Uwe Helmut Jost, Groton, MA (US); Patrick Aubrey Naylor, Reading (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 216 days.

(21) Appl. No.: 17/898,829

(22) Filed: Aug. 30, 2022

(65) Prior Publication Data

US 2024/0070239 A1 Feb. 29, 2024

(51) Int. Cl.
*G06F 21/16* (2013.01)
*H04L 9/30* (2006.01)

(52) U.S. Cl.
CPC ............... *G06F 21/16* (2013.01); *H04L 9/30* (2013.01); *H04L 2209/608* (2013.01)

(58) Field of Classification Search
CPC ...... G06F 21/16; G06F 21/31; G06F 11/1004; G06F 16/901; G06F 21/604; G06F 21/6218; H04L 9/30; H04L 9/32; H04L 9/40; H04L 2209/608; H04L 63/12; H04L 63/30; H04L 63/126; H04L 63/123; H04L 63/145; H04L 63/428; H04L 63/442; H04L 63/869; H04L 63/1416; H04L 63/1425; H04L 63/1466; G10L 119/018
USPC .......................................... 713/126; 712/126
See application file for complete search history.

(56) References Cited

U.S. PATENT DOCUMENTS

| | | | | |
|---|---|---|---|---|
| 8,677,132 | B1 * | 3/2014 | Liao ........................ | H04L 9/321 |
| | | | | 713/176 |
| 11,252,469 | B2 * | 2/2022 | Smith .............. | H04N 21/44204 |
| 2006/0107056 | A1 * | 5/2006 | Bhatt .................... | G06T 1/0021 |
| | | | | 713/176 |
| 2006/0107334 | A1 * | 5/2006 | Leone ................ | H04N 1/00832 |
| | | | | 726/27 |
| 2006/0242325 | A1 * | 10/2006 | Ramaswamy ........ | H04L 65/765 |
| | | | | 709/246 |
| 2007/0033419 | A1 * | 2/2007 | Kocher ............ | G11B 20/00884 |
| | | | | 713/193 |

(Continued)

OTHER PUBLICATIONS

"International Search Report and Written Opinion Issued in PCT Application No. PCT/US23/028901", Mailed Date: Sep. 21, 2023, 13 Pages.

(Continued)

*Primary Examiner* — James N Fiorillo
(74) *Attorney, Agent, or Firm* — Foley IP Law, PLLC

(57) ABSTRACT

A method, computer program product, and computing system for receiving, from a requesting party, a request to access data from a storage device. Identity information associated with the requesting party is determined. A bespoke identity-based watermark is generated for the requesting party. The bespoke identity-based watermark is encoded into the data. The watermarked data is provided to the requesting party.

11 Claims, 5 Drawing Sheets

10

(56)     References Cited

U.S. PATENT DOCUMENTS

| 2007/0107063 | A1* | 5/2007 | Eckleder | G06F 21/10 |
| | | | | 726/27 |
| 2008/0103821 | A1* | 5/2008 | Cerbone | G16H 20/10 |
| | | | | 705/2 |
| 2013/0159021 | A1* | 6/2013 | Felsher | G16H 10/60 |
| | | | | 705/3 |
| 2014/0068791 | A1* | 3/2014 | Resch | G06F 21/6272 |
| | | | | 726/30 |
| 2014/0086408 | A1* | 3/2014 | Bickmore | H04N 21/42684 |
| | | | | 380/210 |
| 2015/0124950 | A1* | 5/2015 | Koenig | H04M 3/002 |
| | | | | 379/202.01 |
| 2016/0212103 | A1* | 7/2016 | Rhoads | H04L 63/0869 |
| 2017/0099149 | A1* | 4/2017 | Eber | H04L 63/0281 |
| 2019/0034601 | A1* | 1/2019 | Coleman | G06F 21/604 |
| 2019/0246036 | A1* | 8/2019 | Wu | G06F 3/0484 |
| 2020/0106785 | A1* | 4/2020 | Abbaszadeh | H04L 63/1425 |
| 2020/0125699 | A1* | 4/2020 | Liu | G06F 21/16 |
| 2020/0356644 | A1* | 11/2020 | Liuzzo | G06F 21/16 |
| 2021/0067842 | A1* | 3/2021 | Revital | G06F 21/1063 |
| 2021/0192651 | A1* | 6/2021 | Groth | G06N 3/09 |
| 2022/0021728 | A1* | 1/2022 | Kelly | G06F 21/6245 |
| 2022/0179931 | A1* | 6/2022 | Levacher | G06F 21/16 |
| 2022/0239495 | A1* | 7/2022 | Norton | H04L 9/0825 |
| 2022/0415333 | A1* | 12/2022 | Zhu | G10L 25/51 |
| 2023/0104583 | A1* | 4/2023 | Bekker | G10L 15/063 |
| | | | | 704/232 |
| 2023/0197064 | A1* | 6/2023 | Bekker | G06N 3/08 |
| | | | | 704/200 |
| 2024/0070266 | A1* | 2/2024 | Chai | G06F 21/14 |
| 2024/0221763 | A1* | 7/2024 | Ginsburg | G10L 13/033 |
| 2025/0245773 | A1* | 7/2025 | Hanes | H04N 7/18 |

OTHER PUBLICATIONS

International Preliminary Report on Patentability (Chapter I) received for PCT Application No. PCT/US23/028901, mailed on Mar. 13, 2025, 10 pages.

* cited by examiner

10

SYSTEM AND METHOD FOR WATERMARKING DATA FOR TRACING ACCESS

BACKGROUND

Ambient Cooperative Intelligence (ACI) may be used, e.g., to turn conversational speech and/or video information into transcriptions and formatted reports representing a particular encounter (e.g., an online or in-person meeting between individuals). As such, ACI involves safeguarding access to encounter information that is processed into reports and transcriptions.

In addition to encounter information, data of any kind (e.g., videos, images, photographs, documents, audio recordings, etc.) may be vulnerable to unauthorized access or distribution. Watermarking data provides the ability to determine the source of the data. However, conventional approaches to watermarking data do not follow or trace access of the data.

BRIEF DESCRIPTION OF THE DRAWINGS

Like reference symbols in the various drawings indicate like elements.

DETAILED DESCRIPTION OF THE PREFERRED EMBODIMENTS

Figure 1:
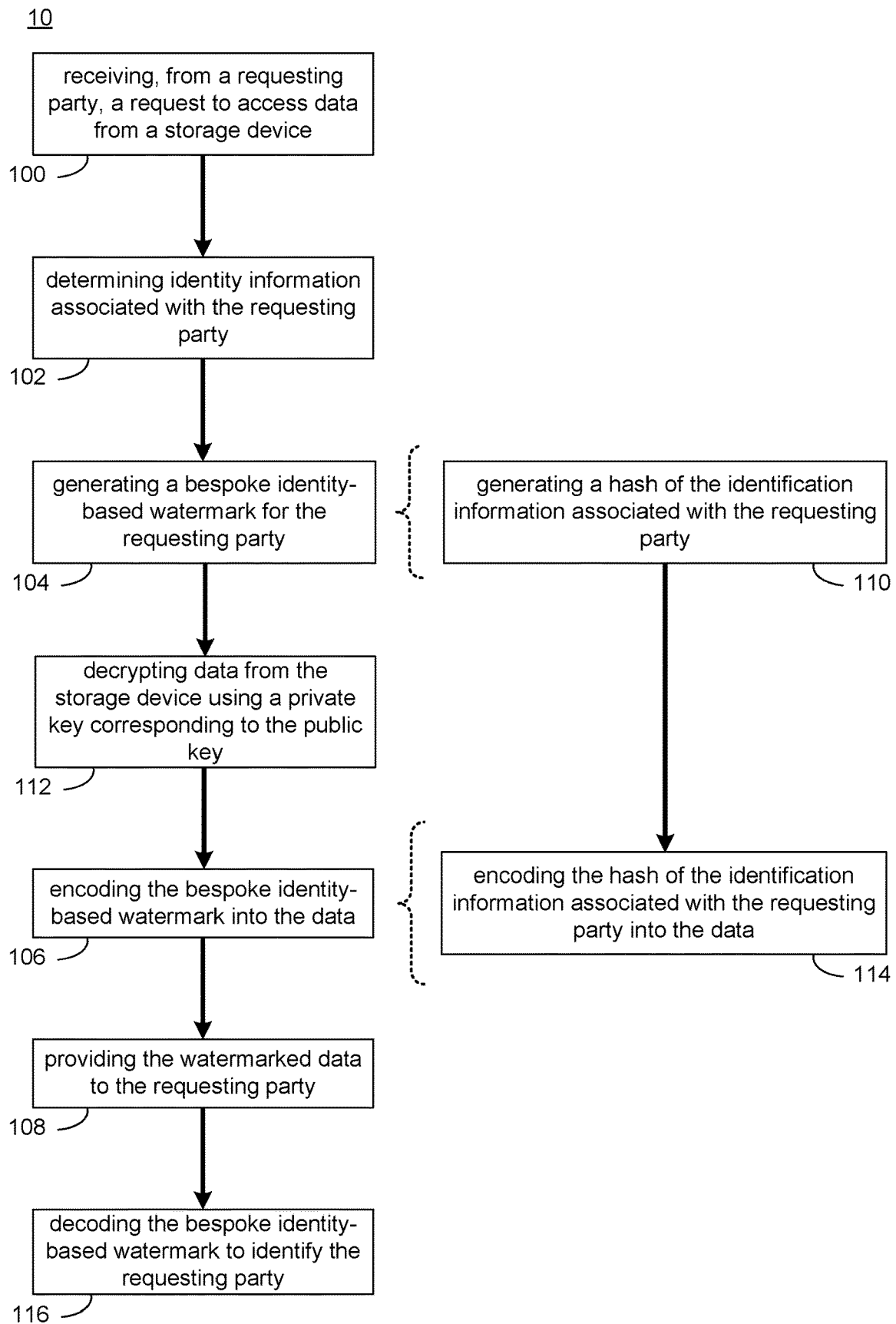
FIG. 1 is a flow chart of one implementation of a watermarking process.

As discussed above, speech signals/audio information are recorded and used with various speech processing systems and/or machine learning models. In addition to encounter information, data of any kind (e.g., videos, images, photographs, documents, audio recordings, etc.) may be vulnerable to unauthorized access or distribution. Watermarking data provides the ability to determine the source of the data. However, conventional approaches to watermarking data are unable to trace access of the data.

As will be discussed in greater detail below, implementations of the present disclosure provide a technical solution necessarily rooted in computing technology to watermark data that traces the access of the data by particular individuals or entities. Specifically, the data is encoded with a bespoke identity-based watermark associated with the individual or entity. In this manner, access of the data can be traced to the individual or entity that obtains the data from secure storage.

The details of one or more implementations are set forth in the accompanying drawings and the description below. Other features and advantages will become apparent from the description, the drawings, and the claims.

The Watermarking Process:

As discussed above, speech signals/audio information are recorded and used with various speech processing systems and/or machine learning models. In addition to encounter information, data of any kind (e.g., videos, images, photographs, documents, audio recordings, etc.) may be vulnerable to unauthorized access or distribution. Watermarking data provides the ability to determine the source of the data.

However, conventional approaches to watermarking data are unable to trace access of the data from secure storage.

As will be discussed in greater detail below, implementations of the present disclosure watermark data that traces the access of the data by particular individuals or entities. Specifically, the data is encoded with a bespoke identity-based watermark associated with the requesting party. In this manner, unauthorized leaks of data can be detected and deterred. For example, suppose a QDS (quality documentation specialist), or a malicious actor with unauthorized access to the QDS's computer, wanted to leak data, in order to learn medical secrets or to damage a particular entity's reputation. As will be discussed in greater detail below, data requested by the QDS from a particular access server is stored in an encrypted form and only decrypted when requested. At the time of decryption, the data is encoded with a bespoke watermark that identifies the requesting entity (e.g., the QDS, in this example). When requests for data are managed in this way, no one, with either legitimate or illegitimate access to the data can get copies of the data without a watermark. This is because the access server has the ability to decrypt the original data. As such, any entity trying to read the data without using the access server will only see encrypted data. Only the access server is able to decrypt the data and will only do so for an authorized request in which it will encode the bespoke watermark in the data it provides to the requesting entity.

Referring to FIGS. 1-5, watermarking process 10 receives 100, from a requesting party, a request to access data from a storage device. Identity information associated with the requesting party is determined 102. A bespoke identity-based watermark is generated 104 for the requesting party. The bespoke identity-based watermark is encoded 106 into the data. The watermarked data is provided 108 to the requesting party.

In some implementations, watermarking process 10 receives 100, from a requesting party, a request to access data from a storage device. For example, a requesting party is any individual, entity, or device that requests access to the data. In one example, a user desires to obtain information from a secure storage device. In this example, the user, via a client electronic device, provides a request to watermarking process 10. In some implementations, an access server selectively provides access to the data. For example and referring also to FIG. 2, watermarking process 10 (e.g., via access server 200) receives 100 a request (e.g., request 202) to access data (e.g., data 204) from a storage device (e.g., storage device 206). In some implementations, access server 200 is a server or server component configured to manage remote access to data stored on one or more storage devices (e.g., storage device 206).

Figure 5:
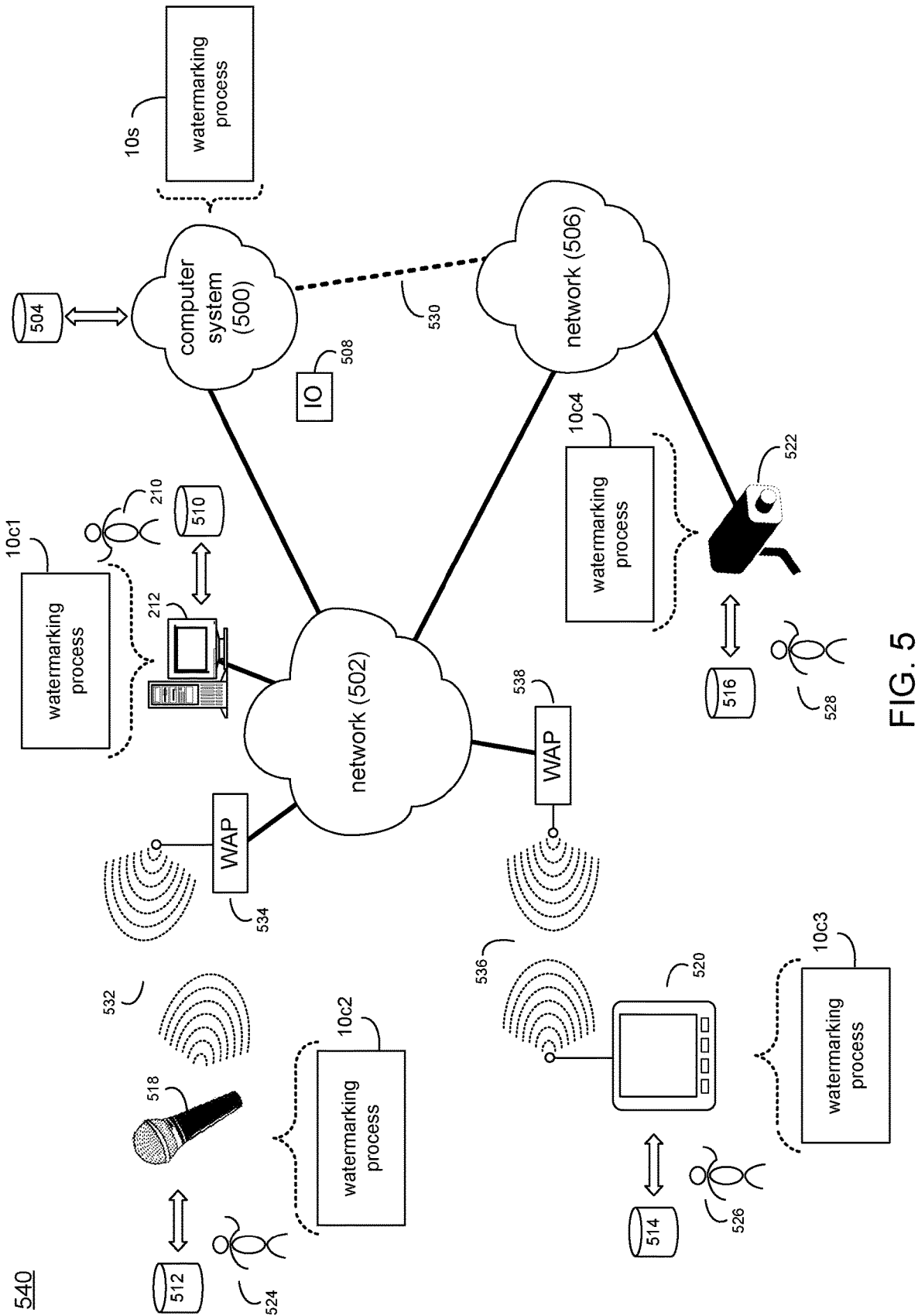
FIG. 5 is a diagrammatic view of a computer system and the watermarking process of FIG. 1 coupled to a distributed computing network.

In some implementations, access server 200 is communicatively coupled to various client electronic devices using various networks and network protocols. Storage device 206 is communicatively coupled via various known networks and network protocols or may be a portion of access server 200. In some implementations and as will be discussed in greater detail below, access server 200 is a computer system as shown in FIG. 5.

In some implementations, the request (e.g., request 202) may or may not include any reference to the storage device (e.g., storage device 206). In one example, a requesting party (e.g., requesting party 208 including user 210 via client electronic device 212) provides a general request or query for data 204 without knowing the location of data 204 in storage device 206. In another example, the requesting party (e.g., requesting party 214) knows the location of data 204 within storage device 206 and provides a request (e.g., request 216) specifically for data 204 stored within storage device 206.

In some implementations, watermarking process 10 receives 100 requests from multiple requesting parties. Referring again to the example of FIG. 2 and in some implementations, watermarking process 10 receives 100 a plurality of requests (e.g., requests 202, 216) for data (e.g., data 204) from a plurality of requesting parties (e.g., requesting parties 208, 214, where requesting party 214 includes user 218 using client electronic device 220).

In some implementations, the data includes audio data/audio information. For example and as discussed above, data 204 represents a portion of audio encounter information. In one example, the data includes automated speech recognition (ASR) audio information. Suppose a conversation is recorded between a doctor and a patient. In this example, the recorded audio information is captured for preserving the content of the conversation (e.g., content of the patient's appointment with the doctor) and for processing into a transcription using an ASR system. In this example, watermarking process 10 receives ASR audio information for storage in a storage device. For example, watermarking process 10 receives ASR audio information from an audio recording system and/or from another computing device for processing with an ASR system. In this example, watermarking process 10 receives ASR audio information for temporary storage (e.g., to process the ASR audio information immediately), for storage until subsequent ASR processing or training (e.g., retaining in storage for future training or processing), and/or for long term storage (e.g., preserving the ASR audio information). As will be discussed in greater detail below, watermarking process 10 encodes a bespoke identity-based watermark into the ASR audio information at the time of access by a requesting party. In this manner, the ASR audio information is traceable to the requesting party that initially obtains the data from secure storage.

In some implementations, watermarking process 10 determines 102 identity information associated with the requesting party. In one example, when accessing access server 200, each requesting party (e.g., requesting parties 208, 214) provides access credentials (e.g., a user name and password) that uniquely identify and authenticate a requesting party for accessing particular data. The access credentials are provided with each request and/or to initiate a session of access communication between the requesting party and access server. During a session, once a requesting party is authenticated, the requesting party accesses the access server without having to re-authenticate for a predefined amount of time (e.g., after 30 minutes of no activity between requesting party and access server). It will be appreciated that various known approaches are used to authenticate a particular requesting party for accessing data using the access server.

Figure 2:
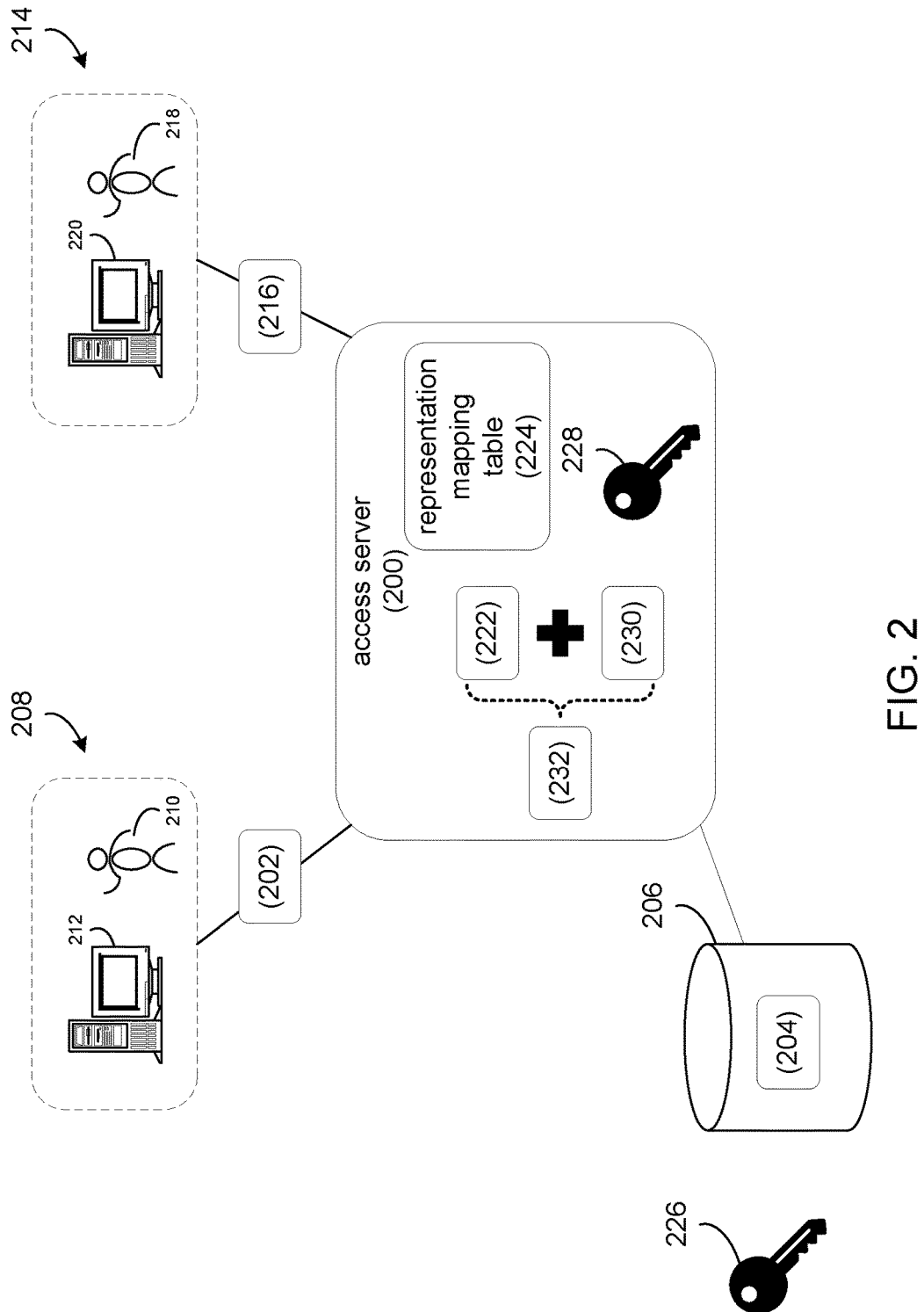
FIGS. 2-4 are diagrammatic views of the watermarking process of FIG. 1.

Continuing with the example of FIG. 2, suppose watermarking process 10 receives 100 a request (e.g., request 202) to access data 204 from requesting party 208. In one example, watermarking process 10 determines 102 identification information associated with requesting party 208 using identification/authentication information (e.g., a user name and password) provided in request 202. In another example, watermarking process 10 determines 102 identification information associated with requesting party 208 by verifying session information for request 202 from requesting party 208. As such, it will be appreciated that watermarking process 10 determines 102 identity information associated with a requesting party in various ways within the scope of the present disclosure.

In some implementations, watermarking process 10 generates 104 a bespoke identity-based watermark for the requesting party. Generally, a watermark is metadata that typically describes data origination information (i.e., creator of the data, owner of the data, device(s) used to generate the data (e.g., microphone used to generate audio information), application(s) used to generate the data, timestamp information, identification information for personal information within the data (e.g., audio information with speaker identity information), etc.). In some implementations, this content or payload is encoded in the watermark.

A bespoke identity-based watermark is a watermark that uniquely identifies a particular requesting party from a plurality of requesting parties or potential requesting parties. In some implementations, a bespoke identity-based watermark includes information identifying a requesting party. For example, the bespoke identify-based watermark includes information concerning the request (e.g., timestamp of request, user credentials identified, etc.). In one example and as will be discussed in greater detail below, the bespoke identity-based watermark includes an authorization chain of requesting entities from the time the data is initially stored in the access server. In another example, the bespoke identity-based watermark also includes other metadata (e.g., data origination, timestamps, devices used to generate the data, etc.). In some implementations, the same bespoke identity-based watermark is used to encode any and all data requested by a specific requesting party. In this manner, a single bespoke identity-based watermark traces any and all data accessed from the access server by a particular requesting party. Referring again to the example of FIG. 2 and in response to determining 102 that request 202 for data 204 is associated with requesting party 208, watermarking process 10 generates 104 a bespoke identity-based watermark 222 for requesting party 208.

Figure 3:
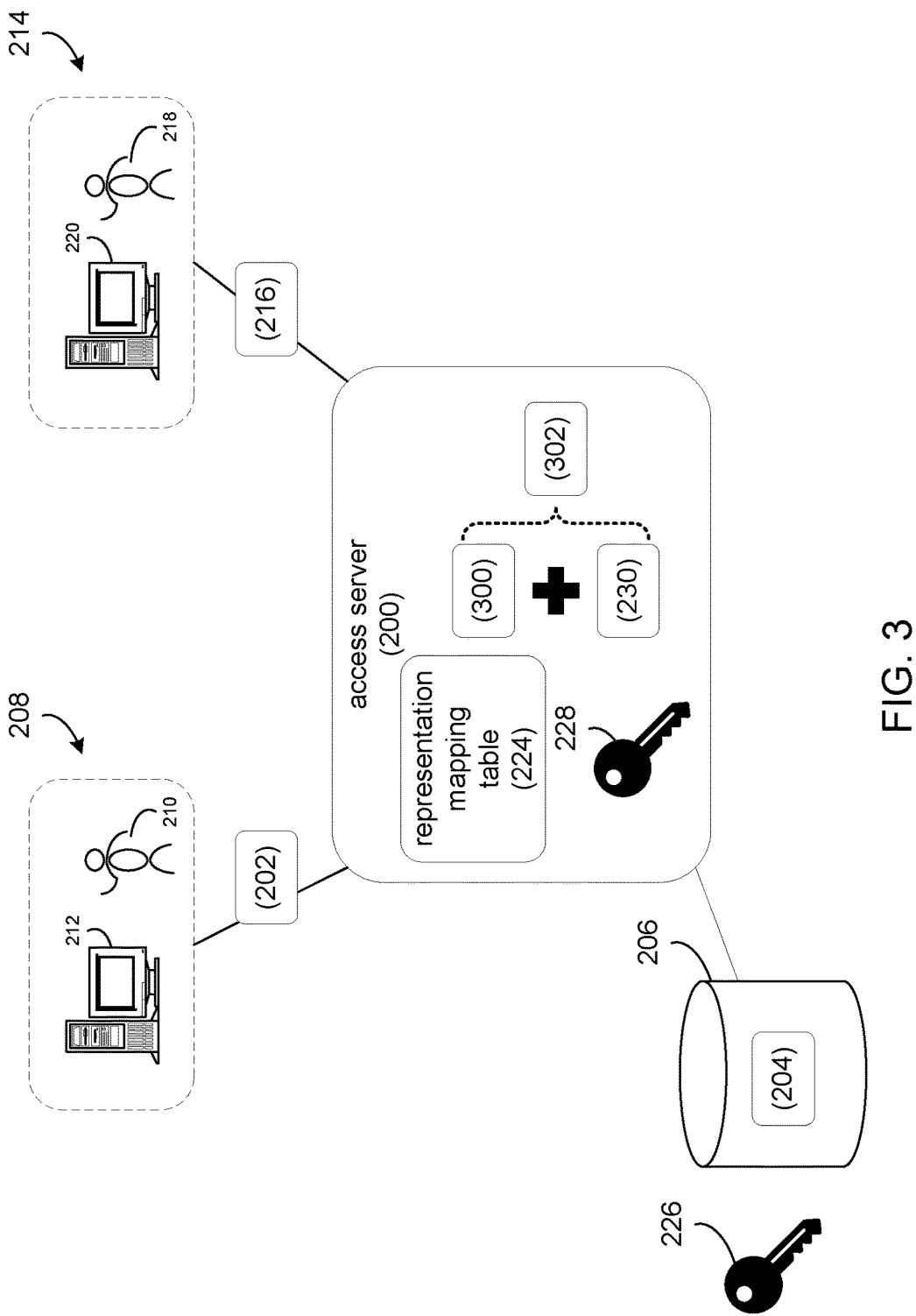
Figure 4:
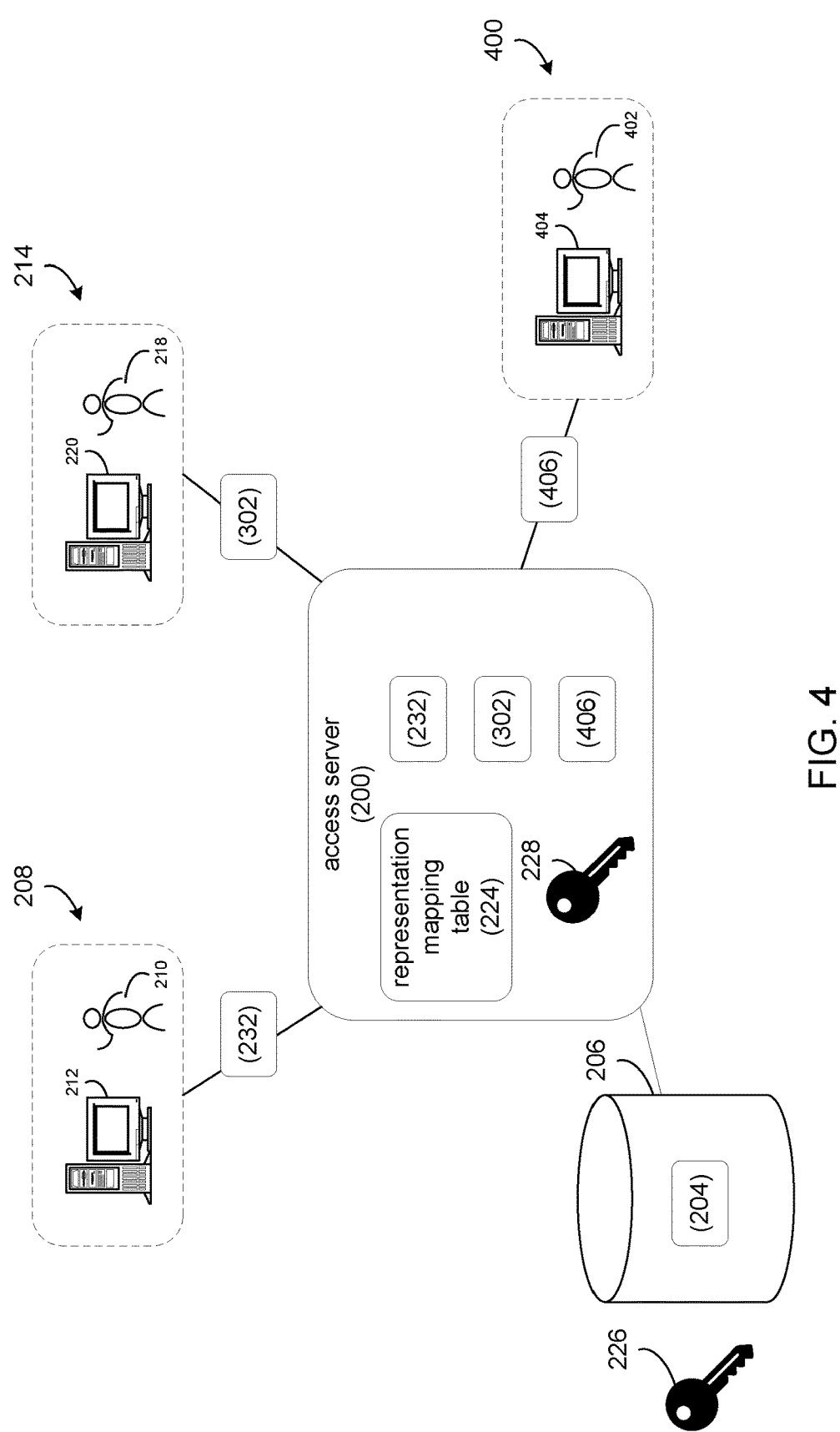

Referring also to the example of FIG. 3, suppose that watermarking process 10 receives 100 request 216 for data 204 and that watermarking process 10 determines 102 the identification information associated with requesting party 214. In this example, watermarking process 10 generates 104 a bespoke identity-based watermark (e.g., bespoke identity-based watermark 300) for requesting party 214. As shown in FIGS. 2-3, while each requesting party requests the same data (e.g., data 204), watermarking process 10 generates bespoke identity-based watermarks (e.g., bespoke identity-based watermarks 222, 300) for each requesting party. In this manner, access to data 204 is traceable to receiving parties 208, 214 using bespoke identity-based watermarks 222, 300, respectively.

In some implementations, generating 104 a bespoke identity-based watermark for the requesting party includes generating 110 a representation of the identification information associated with the requesting party. A representation of the identification information is a symbol or group of symbols that maps to the identification information. For example, watermarking process 10 generates 104 a representation that maps to identification information associated with the requesting party. In one example, watermarking process 10 uses a hash function to compress the size of the payload of the bespoke identity-based watermark. A hash function maps data of arbitrary size to fixed-size values. The values returned by a hash function are called hash values, hash codes, digests, or hashes. The values are used to index a fixed-size table called a hash table. In this example, watermarking process 10 generates a bespoke identity-based watermark by generating a hash of the payload including the identification information associated with the requesting party. As discussed above, the payload includes any additional information with the identification information. While an example of a hash has been described as a representation of the identification information, it will be appreciated that watermarking process 10 generates various types of representations of the identification information within the scope of the present disclosure. For example, watermarking process 10 uses a lookup table with particular entries that map to specific identification information. In this manner, the payload size of the encoded watermark is reduced from the identification information to a representation that maps to the identification information.

In one example, suppose watermarking process 10 receives 100 requests 202, 216 from receiving parties 208, 214, respectively. In this example, watermarking process 10 determines the identification information for each requesting party and generates 110 a representation (e.g., a hash) of the identification information. The identification information and any other payload content for requesting party 208 is stored in a representation mapping table (e.g., representation mapping table 224) and bespoke identity-based watermark 222 is generated with the representation (e.g., hash or hash value) corresponding to the entry in representation mapping table. Similarly, the identification information and any other payload content for requesting party 214 is stored in representation mapping table 224 and bespoke identity-based watermark 300 is generated with the hash or hash value corresponding to the particular entry in hash table. A representation mapping table (e.g., representation mapping table 224) is a data structure or database with a plurality of representations mapping to a plurality of identification information. By using a representation to represent the identification information, the size constraints associated with bespoke identity-based watermarks are reduced.

In some implementations and in response to determining 102 the identification information associated with the requesting party, watermarking process 10 obtains the requested data from the storage device. For example, suppose that watermarking process 10 is unable to identify or authenticate a requesting party when processing a request. In this example, watermarking process 10 responds to the request with an alert or error messaging inviting the requesting party to resolve the issue and to resubmit the request for data. In another example, suppose that watermarking process 10 determines 102 the identification information associated with the requesting party. In this example, watermarking process 10 obtains the requested data from the storage device for processing on the access server. Referring again to the example of FIG. 2, suppose that watermarking process 10 determines 102 the identification information associated with requesting party 208 (e.g., requesting party 208 includes user 210 using client electronic device 212). In this example, watermarking process 10 obtains data 204 from storage device 206 for processing using access server 200.

In some implementations, watermarking process 10 decrypts 112 the data from the storage device using a private key corresponding to the public key. For example and in some implementations, watermarking process 10 secures data 204 within storage device 206 by encrypting the data using an encryption key. As is known in the art, private/public key pairs are a type of asymmetric cryptography, which is a class of cryptographic protocols that are based upon algorithms that require two separate keys (e.g., a private key and a public key), one of which is publicly available (e.g., public key 226) and one of which is secret (e.g., private key 228). Although these keys (e.g., keys 226, 228) are different, keys 226, 228 are mathematically linked and complimentary with respect to each other. For example, a public key of an intended recipient is used to encrypt data that is then provided to the recipient in an encrypted form. Since this data was encrypted using the public key, the only way to decrypt the data is using the related private key (which is held in secret by the recipient). Accordingly, only the recipient decrypts the encrypted data. Therefore and if encryption key 226 is an asymmetric public encryption key of a private/public key pair, the only way that data 204 is decrypted is through the use of asymmetric private encryption key 228, which is stored on access server 200.

Specifically and with respect to private/public key pair systems, the private key generally may not be computed in any reasonable amount of time from the public key (e.g., using today's technology and equipment, it may take centuries to determine a private key from its corresponding public key). However and given infinite time and resources, the private key may be mathematically determined from the public key.

Additionally and in some private/public key pair systems, neither the public key nor the private key may be computed in a reasonable amount of time from the other key. However and in other private/public key pair systems, the relationship may be asymmetric and the public key may be computed in a reasonable amount of time from the private key. For this disclosure and without loss of generality, the "private key" is intended to be interpreted as the key that may not be computed from the other in a reasonable amount of time. If both of the keys in a private/public key pair system have this property, then either of the keys may be designated as the "private key" and the other key may be designated the "public key".

In some implementations, watermarking process 10 encrypts data 204 using public key 226 upon storage within storage device 206. In this manner, data 204 is secure from unauthorized access until data 204 is decrypted using private key 228. Watermarking process 10 decrypts 112 data 204 to allow for the encoding of the bespoke identity-based watermark (e.g., bespoke identity-based watermark 222) into data 204. As shown in FIG. 2, watermarking process 10 decrypts 112 data 204 using private key 228 to generate decrypted data 230.

In some implementations, watermarking process 10 encodes 106 the bespoke identity-based watermark into the data. Encoding 106 the bespoke identity-based watermark into the data includes adding or applying the bespoke identity-based watermark into the data. For example, suppose that data 204 is an audio file. In this example, watermarking process 10 encodes 104 the bespoke identity-based watermark as an inaudible audio signal (e.g., audio representation in the audio file that is outside of human hearing). In another example, the bespoke identity-based watermark is encoded in the noise or other non-speech portions of the audio file. In the context of a an image file, watermarking process 10 encodes the bespoke identity-based watermark as one or more pixels or other visual markers in particular portions of the image file. In the example of a video file, watermarking process 10 encodes the bespoke identity-based watermark in the combination of an audio signal and one or more pixels or other visual markers in particular portions of the video file. In this manner, watermarking process 10 encodes or adds the bespoke identity-based watermark into the data using any of the various known approaches such that the bespoke identity-based watermark is decodable from the watermarked data. In some implementations, watermarking process 10 uses different watermarking techniques for different types of requested data.

In some implementations, encoding 106 the bespoke identity-based watermark into the data includes encoding 114 the representation of the identification information associated with the requesting party into the data. As discussed above, suppose watermarking process 10 generates 104 bespoke identity-based watermark 222 for requesting party 208 and bespoke identity-based watermark 300 for requesting party 214. For example, suppose that requesting party 208 requests access to data 204 at 12:00 PM on Jul. 1, 2022. Watermarking process 10 saves this identification information in representation mapping table 224 and generates 104 bespoke identity-based watermark 222 (e.g., hash value: 0x049a3f364) mapping to the identification information for requesting party 208. Now suppose that requesting party 214 requests access to data 204 at 3:22 PM on Jul. 26, 2022. Watermarking process 10 stores this identification information in representation mapping table 224 and generates 104 bespoke identity-based watermark 300 (e.g., hash value: 0x36098ab0c) mapping to the identification information for requesting party 214. In this example, each bespoke identity-based watermark is a hash value corresponding to particular entries of representation mapping table 224 including the identification information and any other payload for each requesting party's watermark.

As discussed above, suppose data 204 is audio information or an audio file (e.g., ASR training data). In this example, watermarking process 10 encodes a hash value corresponding to the particular entries of the hash table for a particular bespoke identity-based watermark by generating an audio representation of the hash value and adding the audio representation to the decrypted audio information. As will be discussed in greater detail below, when a leaked document is detected with a watermark for which the payload is a hash, watermarking process 10 looks up the hash in the representation mapping table (e.g., representation mapping table 224) to identify the requesting party. For example, suppose that watermarking process 10 decodes the hash 0x049a3f364, then requesting party 208 leaked data 204. In another example, suppose that watermarking process 10 decodes the hash 0x36098ab0c, then requesting party 214 leaked data 204.

In some implementations, encoding 114 the representation of the identification information associated with the requesting party into the data includes encoding each representation in particular portions of the data. For example, watermarking process 10 defines particular encoding parameters (e.g., frequencies of an audio signal to encode a particular representation in, phase parameters to encode the representation in, etc.). In this manner, encoding each representation of the identification information includes encoding each representation using particular encoding parameters defined for a specific representation. In this example, the diverse encoding parameters for each representation reduces the likelihood that the encoded watermarks are detected and removed.

In some implementations, watermarking process 10 provides 108 the watermarked data to the requesting party. Referring again to FIG. 2, suppose that bespoke identity-based watermark 222 is generated for requesting party 208 and that decrypted data 230 is obtained. In this example, watermarking process 10 encodes 106 bespoke identity-based watermark 222 into decrypted data 230 to generate watermarked data 232. Similarly and as shown in FIG. 3, suppose that watermarking process 10 generates 104 bespoke identity-based watermark 300 for requesting party

214. In this example, watermarking process 10 encodes 106 bespoke identity-based watermark 300 into decrypted data 230 to generate watermarked data 302. In this manner, the same data (e.g., decrypted data 230) is watermarked with bespoke identity-based watermarks generated for each requesting party (e.g., receiving parties 208, 214). Watermarking process 10 provides 108 the watermarked data (e.g., watermarked data 232, 302) to the requesting party (e.g., requesting parties 208, 214, respectively).

In some implementations, watermarking process 10 decodes 116 the bespoke identity-based watermark to identify the requesting party. Decoding 116 the bespoke identity-based watermark includes processing the bespoke identity-based watermark from the suspect watermarked data and attempting to read the watermark from the data. For example, at any point in time after watermarking process 10 provides 108 the watermarked data (e.g., watermarked data 232, 302) to requesting parties 208, 214, watermarking process 10 identifies a copy of watermarked data (or data believed to be watermarked data) outside of the approved access path or circle. Accordingly, watermarking process 10 can decode 116 the bespoke identity-based watermark to trace the unauthorized access of the data back to the requesting party that requested the data from secure storage initially.

Referring again to FIG. 3, suppose that watermarking process 10 identifies data 204 from an unauthorized source and/or in an unprotected environment. For example, suppose that watermarked data 232 is found on a public website or publicly accessible storage system. At this point in time, it is unclear how this data became accessible. In this example, watermarking process 10 decodes 116 the bespoke identity-based watermark from watermarked data 232. Specifically, suppose that watermarking process 10 decodes 116 bespoke identity-based watermark 222 associated with requesting party 208. In this example, watermarking process 10 engages in a remedial action (e.g., generate an alert or notification alerting a storage device administrator, the original owner of the particular data, the requesting party, take a data security action (e.g., prevent subsequent data access to the identified requesting party, revoke access, initiate an investigation, etc.). By decoding 116 bespoke identity-based watermark 222, watermarking process 10 is able to trace the source of a potential data breach by identifying the requesting party that obtained the data from secure storage. In this example, despite receiving parties 208, 214 both requesting data 204, watermarking process 10 is able to trace the exposure of data 232 back to requesting party 208 using bespoke identity-based watermark 222.

In some implementations, the bespoke identity-based watermark allows for tracing data's chain of access. For example and referring also to FIG. 4, suppose that requesting party 208 is provided with watermarked data 232 in response to a request for data 204. Further suppose that requesting party 214 requests access to data 204 and that watermarking process 10 provides watermarked data 302. Now suppose that requesting party 400 (e.g., user 402 with client electronic device 404) requests data 204 and that watermarking process 10 provides watermarked data 406. In this example, suppose that data 204 is leaked to a public resource. In this example, watermarking process 10 uses the bespoke identity-based watermark to generate an audit trail for data 204. Suppose that inspection of data 204 reveals watermarks 222 and 300 but does not find a watermark identifying requesting party 400. In this example, because requesting party 214 is the last accessing party referenced by the bespoke identity-based watermarks, watermarking process 10 investigates a leak of data 204 beginning with requesting party 214. Accordingly and in some implementations, watermarking process 10 uses a plurality of bespoke identity-based watermarks to trace data access and potential data leaks.

System Overview:

Referring also to FIG. 5, there is shown watermarking process 10. Watermarking process 10 may be implemented as a server-side process, a client-side process, or a hybrid server-side/client-side process. For example, watermarking process 10 may be implemented as a purely server-side process via watermarking process 10s. Alternatively, watermarking process 10 may be implemented as a purely client-side process via one or more of watermarking process 10c1, watermarking process 10c2, watermarking process 10c3, and watermarking process 10c4. Alternatively still, watermarking process 10 may be implemented as a hybrid server-side/client-side process via watermarking process 10s in combination with one or more of watermarking process 10c1, watermarking process 10c2, watermarking process 10c3, and watermarking process 10c4.

Accordingly, watermarking process 10 as used in this disclosure may include any combination of watermarking process 10s, watermarking process 10c1, watermarking process 10c2, watermarking process 10c3, and watermarking process 10c4.

Watermarking process 10s may be a server application and may reside on and may be executed by a computer system 500, which may be connected to network 502 (e.g., the Internet or a local area network). Computer system 500 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 500 may execute one or more operating systems.

The instruction sets and subroutines of watermarking process 10s, which may be stored on storage device 504 coupled to computer system 500, may be executed by one or more processors (not shown) and one or more memory architectures (not shown) included within computer system 500. Examples of storage device 504 may include but are not limited to: a hard disk drive; a RAID device; a random access memory (RAM); a read-only memory (ROM); and all forms of flash memory storage devices.

Network 502 may be connected to one or more secondary networks (e.g., network 504), examples of which may include but are not limited to: a local area network; a wide area network; or an intranet, for example.

Various IO requests (e.g., IO request 508) may be sent from watermarking process 10s, watermarking process 10c1, watermarking process 10c2, watermarking process 10c3 and/or watermarking process 10c4 to computer system 500. Examples of IO request 508 may include but are not limited to data write requests (i.e., a request that content be written to computer system 500) and data read requests (i.e., a request that content be read from computer system 500).

The instruction sets and subroutines of watermarking process 10c1, watermarking process 10c2, watermarking process 10c3 and/or watermarking process 10c4, which may be stored on storage devices 510, 512, 514, 516 (respectively) coupled to client electronic devices 212, 518, 520, 522 (respectively), may be executed by one or more processors (not shown) and one or more memory architectures (not shown) incorporated into client electronic devices 212, 518, 520, 522 (respectively). Storage devices 510, 512, 514, 516 may include but are not limited to: hard disk drives; optical drives; RAID devices; random access memories (RAM); read-only memories (ROM), and all forms of flash memory storage devices. Examples of client electronic devices 212, 518, 520, 522 may include, but are not limited to, personal computing device 212 (e.g., a smart phone, a personal digital assistant, a laptop computer, a notebook computer, and a desktop computer), audio input device 518 (e.g., a handheld microphone, a lapel microphone, an embedded microphone (such as those embedded within eyeglasses, smart phones, tablet computers and/or watches) and an audio recording device), display device 520 (e.g., a tablet computer, a computer monitor, and a smart television), machine vision input device 522 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 210, 524, 526, 528 may access computer system 500 directly through network 502 or through secondary network 506. Further, computer system 500 may be connected to network 502 through secondary network 506, as illustrated with link line 530.

The various client electronic devices (e.g., client electronic devices 212, 518, 520, 522) may be directly or indirectly coupled to network 502 (or network 506). For example, personal computing device 212 is shown directly coupled to network 502 via a hardwired network connection. Further, machine vision input device 522 is shown directly coupled to network 506 via a hardwired network connection. Audio input device 518 is shown wirelessly coupled to network 502 via wireless communication channel 532 established between audio input device 520 and wireless access point (i.e., WAP) 534, which is shown directly coupled to network 502. WAP 534 may be, for example, an IEEE 802.11a, 802.11b, 802.11g, 802.11n, Wi-Fi, and/or Bluetooth™ device that is capable of establishing wireless communication channel 532 between audio input device 518 and WAP 534. Display device 520 is shown wirelessly coupled to network 502 via wireless communication channel 536 established between display device 522 and WAP 538, which is shown directly coupled to network 502.

The various client electronic devices (e.g., client electronic devices 212, 518, 520, 522) may each execute an operating system, wherein the combination of the various client electronic devices (e.g., client electronic devices 212, 518, 520, 522) and computer system 500 may form modular system 540.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 502).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

storing data on a storage device, the data including an encrypted audio file;

receiving, from an authorized requesting party, a request to access the data from the storage device;

determining identity information associated with the authorized requesting party;

generating a bespoke identity-based watermark for the authorized requesting party by applying a hash function to a payload containing the identity information associated with the authorized requesting party, wherein the payload further contains a timestamp associated with the request received from the authorized requesting party, and wherein the bespoke identity-based watermark identifies the timestamp of the request in addition to the authorized requesting party;

encoding the bespoke identity-based watermark into the data to obtain encoded watermarked data identifying the authorized requesting party, wherein encoding the bespoke identity-based watermark into the data comprises decrypting the encrypted audio file using a private key and encoding the bespoke identity-based watermark as an inaudible audio signal within the decrypted audio file, the inaudible audio signal being outside of human hearing;

providing the encoded watermarked data to the authorized requesting party; and upon detection of a data leak in which a copy of the data has been accessed by, or otherwise made accessible to, an unauthorized party, detecting the bespoke identity-based watermark within the copy of the data, wherein the bespoke identity-based watermark is used to trace access of the data from the timestamp of the request and to identify the authorized requesting party as a potential source of the data leak.

2. The computer-implemented method of claim 1, wherein the encrypted audio file was encrypted using a public key corresponding to the private key.

3. The computer implemented method of claim 1, wherein the encrypted audio data is recorded by an Ambient Cooperative Intelligence (ACI) system monitoring a private meeting between participants.

4. A computing system comprising:

one or more processors; and a memory storing programming instructions for execution by the one or more processors, the programming instructions, upon execution by the one or more processors, causing the computing system to perform the following operations:

storing data on a storage device, the data including an encrypted audio file;

receiving, from an authorized requesting party, a request to access the data from the storage device;

determining identity information associated with the authorized requesting party;

generating a bespoke identity-based watermark for the authorized requesting party by applying a hash function to a payload containing the identity information associated with the authorized requesting party, wherein the payload further contains a timestamp associated with the request received from the authorized requesting party, and wherein the bespoke identity-based watermark identifies the timestamp of the request in addition to the authorized requesting party;

encoding the bespoke identity-based watermark into the data to obtain encoded watermarked data identifying the authorized requesting party, wherein encoding the bespoke identity-based watermark into the data comprises decrypting the encrypted audio file using a private key and encoding the bespoke identity-based watermark as an inaudible audio signal within the decrypted audio file, the inaudible audio signal being outside of human hearing;

providing the encoded watermarked data to the authorized requesting party; and upon detection of a data leak in which a copy of the data has been accessed by, or otherwise made accessible to, an unauthorized party, detecting the bespoke identity-based watermark within the copy of the data, wherein the bespoke identity-based watermark is used to trace access of the data from the timestamp of the request and to identify the authorized requesting party as a potential source of the data leak.

5. The computing system of claim 4, wherein the data includes automated speech recognition (ASR) training data.

6. The computing system of claim 4, wherein the encrypted audio file was encrypted using a public key corresponding to the private key.

7. The computing system of claim 4, wherein the encrypted audio data is recorded by an Ambient Cooperative Intelligence (ACI) system monitoring a private meeting between participants.

8. A computer program product residing on a non-transitory computer readable medium having programming instructions stored thereon which, when executed by one or more processors of a computing system, cause the computing system to perform the following operations:

storing data on a storage device, the data including an encrypted audio file;

receiving, from an authorized requesting party, a request to access the data from the storage device;

determining identity information associated with the authorized requesting party;

generating a bespoke identity-based watermark for the authorized requesting party by applying a hash function to a payload containing the identity information associated with the authorized requesting party, wherein the payload further contains a timestamp associated with the request received from the authorized requesting party, and wherein the bespoke identity-based watermark identifies the timestamp of the request in addition to the authorized requesting party;

encoding the bespoke identity-based watermark into the data to obtain encoded watermarked data identifying the authorized requesting party, wherein encoding the bespoke identity-based watermark into the data comprises decrypting the encrypted audio file using a private key and encoding the bespoke identity-based watermark as an inaudible audio signal within the decrypted audio file, the inaudible audio signal being outside of human hearing;

providing the encoded watermarked data to the authorized requesting party; and upon detection of a data leak in which a copy of the data has been accessed by, or otherwise made accessible to, an unauthorized party, detecting the bespoke identity-based watermark within the copy of the data, wherein the bespoke identity-based watermark is used to trace access of the data from the timestamp of the request and to identify the authorized requesting party as a potential source of the data leak.

9. The computer program product of claim 8, wherein the data includes automated speech recognition (ASR) training data.

10. The computer program product of claim 8, wherein the encrypted audio file was encrypted using a public key corresponding to the private key.

11. The computer program product of claim 8, wherein the encrypted audio data is recorded by an Ambient Cooperative Intelligence (ACI) system monitoring a private meeting between participants.

* * * * *